United States Patent [19]
Mayor et al.

[11] Patent Number: 5,974,074
[45] Date of Patent: Oct. 26, 1999

[54] LASER SYSTEM FOR OPTICAL FREE

[75] Inventors: Jean-Michel Mayor, Yverdon-les-Bains; Thomas Graf, Bern; Juerg Balmer, Biel, all of Switzerland

[73] Assignee: Oerlikon Contraves AG, Zurich, Switzerland

[21] Appl. No.: 08/994,841

[22] Filed: Dec. 19, 1997

[30] Foreign Application Priority Data

Dec. 20, 1996 [CH] Switzerland .............................. 963146

[51] Int. Cl.$^6$ ...................................................... H01S 3/08
[52] U.S. Cl. .......................................... 372/106; 359/338
[58] Field of Search ............................ 372/106; 359/333, 359/338, 339, 342

[56] References Cited

U.S. PATENT DOCUMENTS

| | | | |
|---|---|---|---|
| 4,993,813 | 2/1991 | Hiire | 372/27 |
| 5,249,196 | 9/1993 | Scheps . | |
| 5,388,113 | 2/1995 | Oka | 372/21 |

OTHER PUBLICATIONS

Baer et al. "Performance of Diode–Pumped Nd:YAG and YLF Lasers in a Tightly Folded Resonator Configuration" *IEEE Journal of Quantum Electronics* vol. 28, No. 4, 1992 pp. 1131–1137 no month.

Kane et al. "Diode–Pumped Nd:YAG Amplifier with 52–dB gain" *Free–Space Laser Communication Technologies VII SPIE* vol. 2381, Feb. 1995, pp. 273–284.

Araki et al. "Laser transmitter systems for high–data–rate optical inter–orbit communications" *Free–Space Laser Communication Technologies VII SPIE* vol. 2381, Feb. 1995, pp. 264–272.

Yanovsky et al. "Compact, Single–Frequency, High–Power ND: Glass Laser" *IEEE Journal of Quantam Electronics* vol. 30, No. 4, 1994 pp. 884–886 no month.

Marshalek et al. "Lightweight, high–data–rate laser communications terminal for low–Earth–orbit satellite constellations" *SPIE* vol. 2381 1995 pp. 72–82 no month.

Krainak et al. "1047–nm Master Oscillator Power Amplifier Free–Space Optical Communications laser Transmitter" *IEEE Journal of Quantum Electronics* vol. 032, No. 1 Jan. 1996 pp. 112–117.

Olson et al. Multipass Diode–Pumped Nd:YAG Optical Amplifiers At 1.06 um and 1.32 um *IEE Photonics technology letters* vol. 6, No. 5, May 1994 pp. 605–608.

Carlson et al. "Monolithic Glass Block Lasercom Terminal: Hardware Proof of Concept and Test Results" *SPIE*, vol. 2381 1995 pp. 90–102 no month.

*Primary Examiner*—Rodney Bovernick
*Assistant Examiner*—Robert E. Wise
*Attorney, Agent, or Firm*—Townsend and Townsend and Crew, LLP; Guy W. Chambers

[57] ABSTRACT

The instant invention relates to a laser system for optical free space communications, in particular the generation of amplified laser light under conditions in outer space. In the process, an optical beam (72) to be amplified is conducted via a polarizing beam splitter (71) to a Faraday rotator (70) and brought from there to a neodymium crystal (68). By means of reflection, appropriate diffraction and passage through a quarter-wave plate (67), a multiple passage through the neodymium crystal (68) is forced and amplification is achieved by this.

14 Claims, 5 Drawing Sheets

LASER SYSTEM FOR OPTICAL FREE

FIELD OF THE INVENTION

The instant invention relates to a method for operating a laser system for optical free space communications, in particular the generation of amplified laser light under conditions in outer space. It further relates to an arrangement for executing the method.

BACKGROUND OF THE INVENTION

In the near future, optical free space communications between satellites and satellites and ground stations will represent an important supplement to existing microwave technology, including weight-savings on board the satellites. So-called optical terminals comprise one or more telescopes, which limit the angular area of the field of vision of an optical receiver in the direction toward a counter station, and also provide the directional beaming of the signals to be transmitted. Furthermore, several movable mirrors are provided, by means of which the alignment of the transmitting and receiving directions is performed. Besides the direct detection of the optical output of the transmitter of the counter station constituting the transmission method, the coherent superimposition of the received light with the light of a local oscillator laser having the same frequency plays an important role since, besides a great sensitivity to the signal to be detected, the insensitivity to interferences by other light sources present in the background is important.

Several lasers are required in connection with all the methods mentioned hereinafter. On the one Hand, in order to provide the light output for the optical transmitter, on the other hand, to generate the light output for a so-called beacon. This is an optical transmitter which radiates in an unmodulated manner, which, compared to the transmitter intended for communications, emits a significantly increased power to a large spatial angle, in order to make it possible for a counter station to align the transmitting beam with its own receiver.

Coherent methods additionally need a local oscillator laser, on whose light the received light is superimposed in the photodetector of the receiver. Several types of laser can be selected for all these purposes. Although diode lasers, which have reached a high state of development because of their extensive application in fiber-optic communications, represent an alternative at least for simple systems operating with intensity modulation, which in addition also saves space and weight, they are generally not yet suitable for coherent transmissions, in spite of an operation on only a single optical frequency having been achieved here, too, aside from complicated structures with large, additionally coupled resonators. One reason is the still too great spectral width of this single radiated optical frequency. Although fiber-optical coherent transmission systems also operate with commercially available diode lasers, detection is performed at relatively high optical output because of the waveguide transmission.

Existing background of other light sources, which interferes with free space transmissions, as well as the mostly very low power of the received signal, however, necessitate an optical bandwidth of the unmodulated signal, which is considerably narrower than the modulation bandwidth. These are criteria which, together with small size and low weight, can be best met by diode laser-pumped solid state lasers. Existing attempts to integrate the laser systems necessary for operation in a terminal for optical free space communications have been described by Carlson et al. and Marshalek et al. (R. T. Carlson et al., "Monolithic Glass Block Lasercom Terminal: Hardware Proof of Concept and Test Results", SPIE, vol. 2381, Free space Laser Communication Technologies VII, Feb. 7–8, 1995, San Jose, Calif., pp. 90 to 102; R. G. Marshalek et al., "Lightweight, High-Data-Rate Laser Communications Terminal for Low-Earth Orbit Satellite Constellations", SPIE vol. 2381, Free space Laser Communication Technologies VII, Feb. 7–8, 1995, San Jose, Calif., pp. 72 to 82).

Both groups of authors describe laser systems which are mechanically coupled to the optical system of a terminal and conduct their light emissions via collimated beams into the optical device. However, diode lasers have been used in this example of the prior art.

Diode laser-pumped solid state lasers have a larger volume and reduced efficiency, therefore they generate a larger amount of waste heat than a diode laser. The increased amount of heat produced in the vicinity of the optical system has been shown to be a risk for the undisturbed operation of the optical system.

The insufficient modulation capacity of diode laser-pumped solid state lasers presents a further problem. In contrast to diode lasers, the medium generating the optical gain remains for a relatively long time in the excited state after pump energy was supplied. Furthermore, the resonator of such lasers is considerably larger than that of diode lasers. Accordingly, for amplitude modulation, for example, cut-off frequencies of approximately 100 kHz are the rule. The external modulation required because of this is fairly hard to provide, since a high optical output must be handled, which demands the employment of electro-optical modulators with low cut-off frequencies.

The external modulation of laser light can be provided at high cut-off frequencies in modulators in which light is conducted in a waveguide which permits a short distance between each of the electrodes that provide the modulating voltage, and therefore permits a reduced modulation voltage. Since this method only permits low optical power because of the great increase of the optical power density caused by the narrow cross section of the optical waveguide, it is necessary to boost the modulated optical signal. Attempts to do this consist on the one hand in applying methods and devices which in the meantime have proven themselves in fiber-bound optical communications, for example by boosting the modulated optical signal by means of a fiber amplifier doped with erbium (T. Araki, M. Yajima, S. Nakamori, Y. Hisada, "Laser Transmitter Systems for High-Data-Rate Optical Inter-Orbit Communications", SPIE vol. 2381, Free space Laser Communication Technologies VII, Feb. 7–8, 1995, San Jose, Calif., pp. 264 to 272).

Besides diode laser-pumped solid state lasers, appropriate traveling wave amplifiers are used, wherein devices are made available which are particularly suitable for boosting light of lasers operated with the same techniques, particularly for the diode laser-pumped neodymium-YAG solid state lasers, which are very convenient for optical free space communications because of their narrow spectral width. The light to be amplified is conducted into an amplifying crystal, in which the photons of the optical beam will encounter with a certain probability atoms which are in an optical excited metastable state, which has a comparably long temporal stability due to the special properties of the material. The relative stability of this state is now disturbed by a photon of the same energy as the difference between the excited state and a lower energy state of the atom, in the process of which the respective atom emits an additional photon with the same phase and the same energy, i.e. the same wavelength.

The excited state of the atoms is produced by the so-called pump light, which has a shorter wavelength than the light to be amplified and puts the atoms into an excited state which corresponds to the energy of the photons, from which they pass over into a relatively stable state, whose energy difference to the lower laser level corresponds to the energy of the photons of the light to be amplified. A large amplification of the light is achieved, if the photons of the light to be amplified encounter many excited atoms when passing through the amplifying medium. Accordingly, the volume density of excited atoms must be high. However, since a defined portion per unit of time of the excited atoms, because of a finite average lifetime of the excited state, spontaneously returns to the ground state, and the photon emitted in this process is lost for the amplification of the light, to reach a high volume density of excited atoms, it is necessary to continuously radiate pump light at a high rate into the medium, even if light to be amplified is lacking, in order to obtain the high volume density of excited atoms, because of which the efficiency of such devices is extremely poor at high amplification factors. Very low amplification factors can be observed if the light to be amplified already has a high intensity, i.e. if a large average rate of photons passes through the amplifying medium and the density of excited atoms is low because of a high rate of stimulated emissions of additional photons.

Each atom excited by the pump light photon is placed into the ground state after an, on average, short time by a photon of the light to be amplified. With a comparably long average lifetime of the excited atoms, there is a comparatively low probability of a spontaneous and therefore useless change into the basic state, so that with low amplification the efficiency is high.

In order to achieve high amplification and, at the same time, a high rate of stimulated transitions into the ground state, it is necessary, in spite of the low density of excited atoms in the amplifying medium, to assure a high average number of additional photons generated by stimulated transitions of excited atoms into the ground state. In most cases this is achieved in that the light to be amplified is conducted on as many paths as possible through the zone of an amplifying medium which is irradiated by pump light. By means of this, with a respectively constant volume density of excited atoms, there is a multiple, corresponding to the number of passages, of the probability of a single passage generating additional photons for each coupled-in photon of the light to be amplified.

In spite of a low pump power it is therefore possible to achieve an considerable amplification factor. However, the devices in accordance with the prior art are constructed of several elements requiring a large amount of space and mass, which therefore only poorly meet space travel-specific requirements. Special designs also include the risk of insufficient mechanical ruggedness (T. J. Kane, E. A. P. Cheng, B. Nguyen, "Diode-Pumped ND:YAG Amplifier with 52 dB Gain", SPIE vol. 2381, Free space Laser Communication Technologies VII, Feb. 7–8, 1995, San Jose, Calif., pp. 273 to 284; T. E. Olson, T. J. Kane, W. M. Grossmann, H. Plaessmann, "Multipass Diode-Pumped ND:YAG Optical Amplifiers at 1.06 mm and 1.32 mm", Optics Letters, vol. 6, No. 5, May 1994, pp. 605 to 608).

An additional problem for space travel applications lies in that the diode lasers, which are also employed for generating the pump light, have a limited lifetime. It is accordingly necessary to keep a plurality of redundant diode lasers in readiness for each diode laser-pumped solid state laser and each diode laser-pumped optical amplifier in order to be able to replace failures.

OBJECT AND SUMMARY OF THE INVENTION

It is therefore the object of the below described invention to avoid the disadvantages of the prior art and to assure the generation of a sufficiently modulated as well as unmodulated light output by lasers for the operation of an optical terminal.

The invention relates to a method for operating several lasers for the purpose of making modulated and unmodulated laser light available for optical information transmission by means of an optical terminal, as well as arrangements required for this.

Unmodulated light for operating an optical homodyne receiver is generated in a separate neodymium-YAG laser, is conducted through an optical isolator, which has the property of damping out reflected light which spreads in the opposite direction through the laser, and therefore to prevent reactions of the laser which hamper the steadiness of its light output as well as the stability of the optical frequency of its emission. Subsequently, the light is conducted to the actual receiver via a polarization-maintaining monomode fiber. The light of another diode laser-pumped neodymium-YAG laser operating at a low optical output is also coupled into a waveguide modulator after passing an isolator in order to be modulated in its phase with a broadband communications signal. Optical power boosting of the modulated signal takes place after this and is performed either in a diode laser-pumped amplifier or in a doped optical fiber. The optical fiber is made of glass and is doped with neodymium, in contrast to the customary erbium-doped fibers. In addition, an automatic adjustment of the polarization of the amplified light leaving the non-polarization-maintaining fiber is provided. The diode laser-pumped amplifier consists of a neodymium-YAG crystal, whose volume is irradiated along two beams with pump light from diode lasers. The light to be amplified is coupled into the crystal in such a way that prior to leaving the crystal amplified, it moves several times through the crystal along the zones irradiated by the beam-shaped pump light because of being reflected at several polarization-selective and reflecting layers, which have either been applied directly to the lateral sides of the crystal or are located on the side of quarter-wave plates facing away from the crystal, and which are respectively arranged in the immediate vicinity of a surface of the crystal.

The arrangement of the invention is additionally distinguished in that a heavy, so-called Faraday rotator in connection with an additional polarizing beam splitter is not required for the separation of optical beams which move into and out of the crystal in opposite directions, if a mirror placed in the direct vicinity of a surface of the crystal is placed at a slight angle in respect to the entering optical beam to be amplified, so that the beam which exits the crystal again is slightly laterally offset in respect to the entering optical beam, wherein the lateral offset exceeds the diameter of the optical beams. By means of an acute angle of a small absolute value at which the two beams are propagating with respect to each other because of the oblique reflection of the obliquely reflecting mirror placed next to a surface of the crystal, it is possible to perform the separation of the beams, at a defined distance from the corresponding surface of the crystal by means of a mirror.

A further scaling of this concept consists of two crystals separated by a polarization-selective layer, because of which the light to be amplified passes through the zones irradiated by pump light of one of the crystals twice, and 8 times in the other crystal. Two quarter-wave plates are employed here, wherein one of the two quarter-wave plates does not reflect an entering optical beam on itself, but deflects it by a small angle, because of which the optical beam emerging from the crystals can also be separated from the entering optical beam merely by a mirror.

Both neodymium-YAG lasers are provided with pump light by diode lasers. The pump light can be guided by a plurality of redundantly provided diode lasers in a multimode optical fiber, whose outlet then leads via a beam-shaping optical device into the crystal of an amplifier. If the light of the diode lasers generated at a wavelength of 809 nm is also used for operating an optical beacon transmitter, which must have a considerably larger light output than the transmitter used for the actual communications, and therefore beams an unmodulated signal over a larger angular area and is used for making the mutual direction finding possible during the establishment of the connection between two terminals, the light required for operating the beacon transmitter and generated by the diode laser can be rerouted into a neodymium-YAG amplifier located in the optical transmitter after the stations have established contact with each other.

A further concept for the redundant availability of several diode lasers includes the assembly and the separate alignment of several diode lasers on an optical bench, wherein the collimated beams of the diode lasers are guided through a polarizing beam splitter to an optical device which focuses the beams into the crystal. By means of one polarizing beam splitter in a linearly arranged row of polarizing beam splitters, each diode laser is reflected in the direction of the crystal arranged at the end of the row, wherein the remaining polarizing beam splitters which are to be passed on the way to the crystal are not permitted to reflect the collimated beam of the respective diode laser. This is achieved by inserting a so-called half-wave plate between the first two polarizing beam splitters, through which the collimated beam for the respective diode laser passes, because of which the optical beam reflected by the first polarizing beam splitter can pass through all the following polarizing beam splitters in its path without being reflected, because the half-wave plate placed between the first and the second polarising beam splitter has rotated the plane of polarization of the optical beam by 90 degrees.

The method in accordance with the invention for generating modulated and unmodulated laser light includes the advantage of making possible the generation and modulation of high power outputs by means of diode laser-pumped neodymium-YAG lasers, without releasing the waste heat generated by this in the vicinity of optical units which would be hampered in their ability to function by this. When employing a diode laser-pumped amplifier mounted on an optical unit, the required pump power can be conducted through multimode fibers into the crystal of the amplifier, wherein the heat released mainly in the diode lasers is generated at a remote location.

An advantageous characteristic of the device used by this method for supplying the pump output required for the amplifier through optical multimode fibers lies in that, by diversion in an electromechanical fiber-optic switch-over device, this light can also be used for operating an optical beacon transmitter.

The further advantage of the multiply redundant arrangement of diode lasers for generating pump light on an optical bench in connection with polarizing beam splitters lies in the non critical position accuracy of half-wave plates as the only element to be moved in the course of switching over to the optical beam of another diode laser, since these elements, as plan-parallel plates, have no refractive power or diffraction capability, but instead only slightly laterally offset the optical beam if they are non strictly perpendicular to it.

Additional advantages of the devices for amplifying an optical beam in a diode laser-pumped neodymium-YAG laser crystal lie in the multiple passage of the regions of the gain-generating medium irradiated with pump light inside the crystal itself, wherein it is possible to do without the expense usually associated with optical amplifiers operating by the same principle of multiple passage, for example image-producing optical devices, which results in small structural size, low weight and increased immunity to strong accelerations.

Further details, characteristics and advantages of the invention ensue not only from the claims and the characteristics taken therefrom, either by themselves or in combination, but also from the following description of a preferred embodiment.

DETAILED DESCRIPTION OF THE PREFERRED EMBODIMENT

Figure 1:
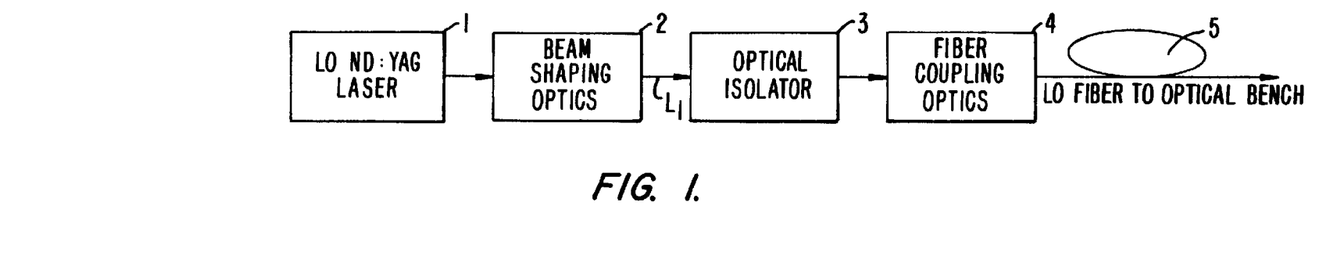
FIG. 1 represents a flow diagram of a method for generating unmodulated laser light conducted in an optical waveguide.

The generation of unmodulated laser light is represented in a flow diagram in FIG. 1. In the process the light emitted by a laser 1 is transformed by a beam-shaping optical device 2 into a collimated beam $L_1$, which generates a round spot on a projection surface arranged perpendicularly in relation to its propagation direction. This beam is conducted through an optical isolator 3, which has the property of letting light pass in only one direction, so that no reflected light can be fed back into the laser 1, which would negatively affect its properties. An optical coupling device 4 conducts the beams into a polarization-maintaining optical monomode fiber 5, which has been strung to a coherent optical receiver.

Figures 2, 3:
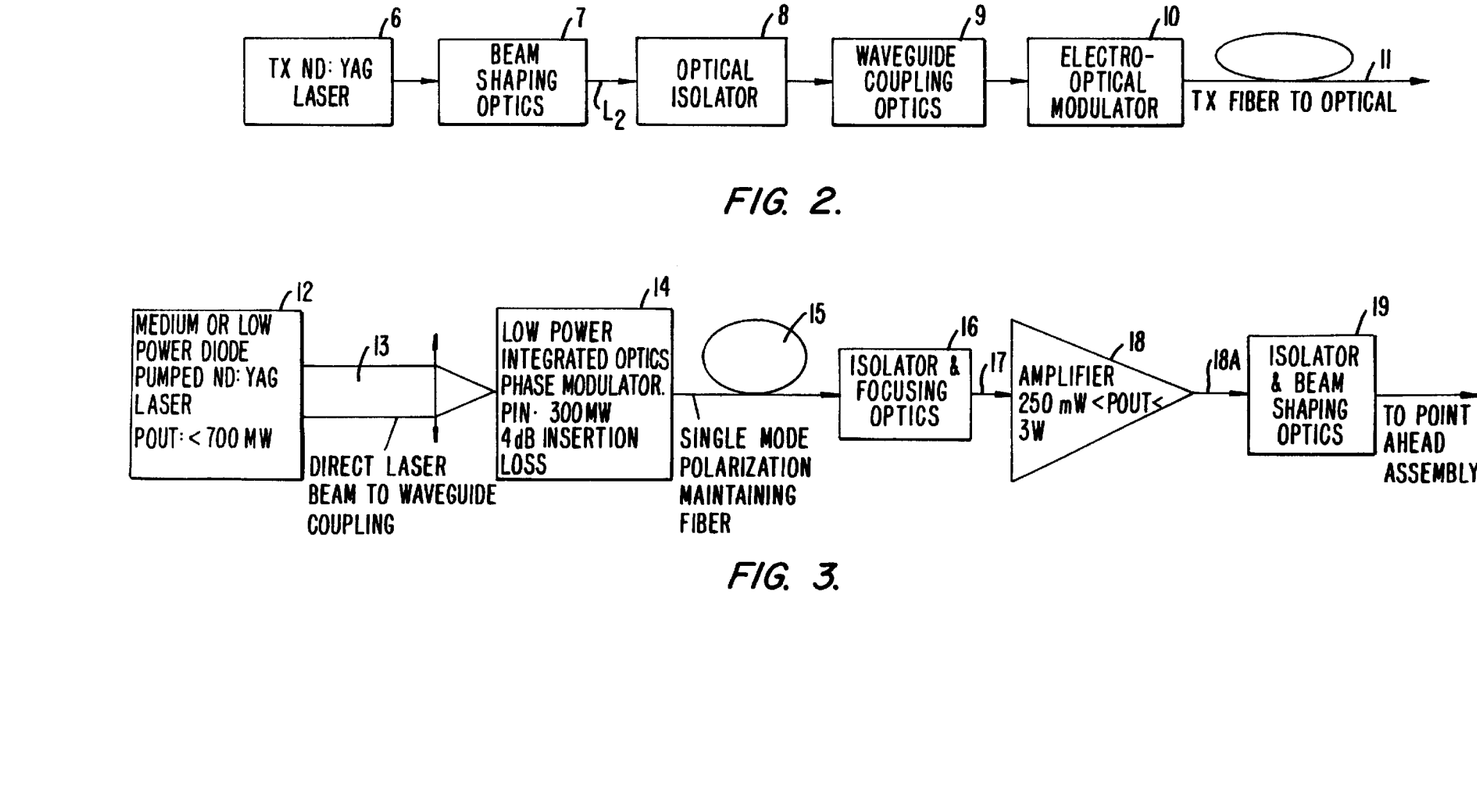
FIG. 2 represents a flow diagram of a method for generating modulated laser light conducted in an optical waveguide.
FIG. 3 represents a flow diagram of a method for generating optically amplified modulated laser light in a collimated beam.

A similar arrangement for the generation of modulated light is represented in FIG. 2. A second laser 6 emits light $L_2$ onto a second beam-shaping optical device 7, this is followed by a second optical isolator 8 and a second optical coupling device 9, which sends the optical beam into an electro-optical traveling wave phase modulator 10. From the waveguide of the traveling wave phase modulator 10, the phase-modulated light directly reaches a polarization-maintaining optical monomode fiber 11, which terminates in an optical transmitting device.

In accordance with the invention represented in FIG. 3 represents a variant of the principle of the method wherein the modulated light is brought to a higher output in an optical amplifier. Unmodulated laser light from a third laser 12 is conducted through a polarization-maintaining optical monomode fiber 13 to a third traveling wave phase modulator 14 and is thereafter conducted through a polarization-maintaining optical monomode fiber 15 to a unit 16 consisting of an optical isolator and an optical focusing device, which converts the light from the polarization-maintaining monomode fiber 15 to a collimated beam 17, which is moved into the crystal of an optical amplifier 18 and through an optical fiber 18A. Subsequently the beam 17 is moved onto another unit 19 consisting of an optical isolator and an optical beam-shaping device and is finally radiated out through an optical transmitting device of the optical terminal.

Figure 4:
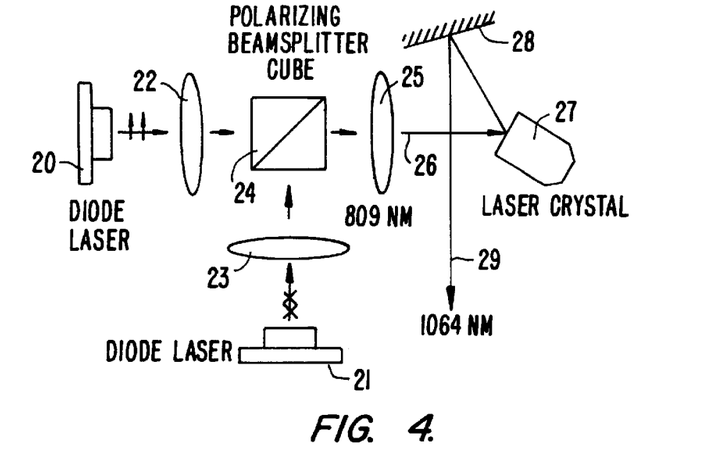
FIG. 4 represents a diagram of a diode laser-pumped solid state laser.

A possible realization of the lasers 1, 6 and 12, which are used in connection with the methods described by FIGS. 1, 2 and 3, is described in FIG. 4. A diode laser 20 and a second diode laser 21 radiate, orthogonally polarized in respect to each other, through respectively one first lens 22 and second lens 23 on a polarizing beam splitter 24. The beams combined into one beam in this way are transformed by means of a third lens 25 into a beam 26, which is directed on a laser crystal 27. In the laser crystal 27, the beam 26 acts as a pump light source for an optical oscillation which, via a mirror 28, is partially coupled out of the crystal 27, embodied as a resonator, as an optical beam 29.

The arrangement of two diode lasers 20 and 21 which are conducted by the polarizing beam splitter 24 independently of each other into the laser crystal 27 and therefore act redundantly of each other, should be mentioned as an unusual feature.

Figure 5:
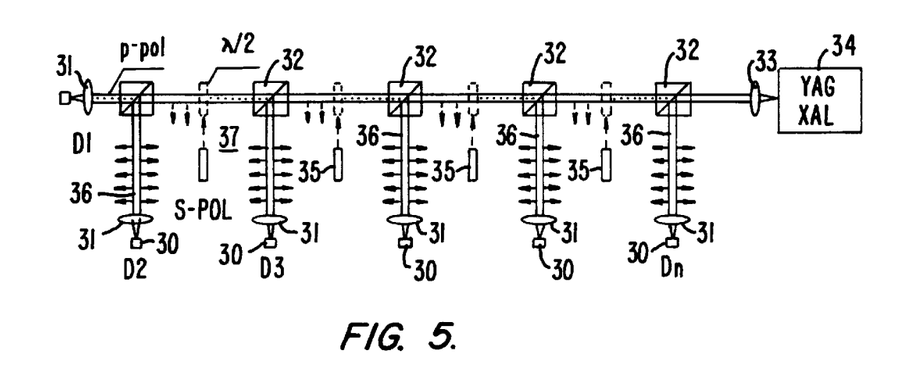
FIG. 5 represents a diagram of a device for multiplexing the emission of a plurality of laser diodes.

An increase in the redundancy of the relatively unreliable diode lasers is represented in FIG. 5. A set consisting of a plurality of diode lasers 30 is coupled via lenses 31, polarizing beam splitters 32 and a lens 33 to a laser crystal 34. The polarizing beam splitters 32 have the property of reflecting a horizontally polarized optical beam 36 on their boundary surface, indicated by an oblique line in FIG. 5, but of letting a vertically polarized optical beam 37 pass. It is therefore possible to insert respectively one half-wave plate 35 between two polarizing beam splitters 32, which does not affect the direction of the propagation of the optical beam 37, but rotates the direction of its polarization by 90 degrees. It is possible in this way for a vertically polarized optical beam 37 to be created from a horizontally polarized optical beam 36, which is reflected at the boundary surface of a polarizing beam splitter 32 in the direction of the vertically polarized optical beam 37 and is matched by an interspersed half-wave plate 35 in the direction of its polarization. The diode laser 30 placed on the left end of the device sketched in FIG. 5 radiates, vertically polarized, into the polarizing beam splitter 32 closest to it. It is possible in principle by means of the device to respectively guide the emissions from a diode laser 30 into the laser crystal 34. Prior to placing the device into operation, the optical beams of all diode lasers are sequentially focused on the laser crystal 34 by putting the respective diode laser into operation and by pushing the half-wave plate 35, which is respectively located to the right of the first polarizing beam splitter to be irradiated, into the beam path. The alignment is then performed by moving the respective lens 31. During the operation of the device, any arbitrary laser 30 can be switched on and its optical beam can be directed on the laser crystal 34 by inserting the appropriate half-wave plate 35. Since the half-wave plates 35 are designed to be plan-parallel, there is no deflection of the optical beam which is to be rotated in its polarization, and half-wave plates 35 which are not exactly at right angles to the optical beam only cause a slight parallel offset of the optical beam 37.

Figure 6:
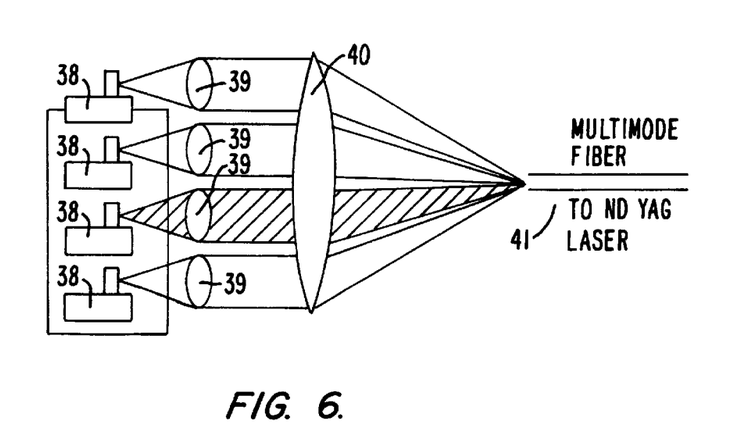
FIG. 6 is a representation of coupling the emissions from a plurality of diode lasers into a multimode optical waveguide.

There is the option as an alternative to conduct the light from diode lasers through a multimode optical wave guide. FIG. 6 is a schematic representation of how the emission of diode lasers 38 is converted by lenses 39 into collimated beams and coupled into a multimode fiber 41 through a lens 40. The multimode fiber 41 transports light in a large number of so-called modes, all of which cause a different progression of the light intensity over the cross-sectional surface of the fiber. But the light output is coupled between all modes in the multimode fiber 41, so that after a short distance in the fiber all modes transport approximately the same amount of light output. For this reason it is possible to operate different diode lasers 38 individually, wherein the light of each diode laser 38 is coupled in different modes at the start of the multimode fiber 41. Since in the course of the multimode fiber 41 the light output is evenly distributed on all modes, the progression of the light intensity over the cross-sectional surface of the fiber does not change as a function of the diode lasers operated at the start of the multimode fiber 41. By means of this it is also possible to assure multiple redundancy of diode lasers.

Figure 7:
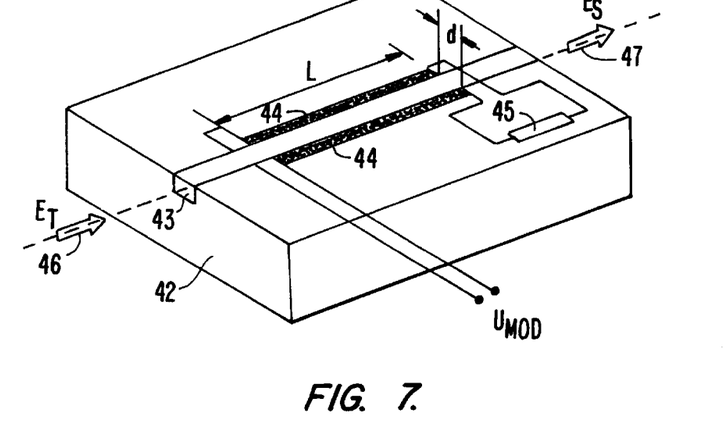
FIG. 7 shows an electro-optical travelling wave phase modulator.

FIG. 7 shows a traveling wave phase modulator, by means of which it is possible to phase-modulate an optical wave of low optical output with low modulation voltage at a high cut-off frequency. The device consists of a lithium niobate block 42, in which, because of doping, a rectangular channel 43 has a slightly higher refraction coefficient then the material surrounding it. The optical wave guide created by this is surrounded by two electrodes 44 applied to the surface of the lithium niobate block 42. Both electrodes 44 constitute a high frequency wave guide, which is closed off reflection-free by a resistor 45 corresponding to the wave resistance of this high frequency line. An effort is made to assure that the high-frequency modulation voltage $U_{mod}$, fed in to the end not connected with the resistor 45 of the electrodes 44 arranged in pairs, moves at the same phase speed as an optical wave 46 coupled in the same direction into the rectangular channel 43, because of which, during the running time along the length L of the electrodes 44, the modulation voltage can act on the optical field, which thereby is converted into a phase-modulated optical wave 47.

Figure 8:
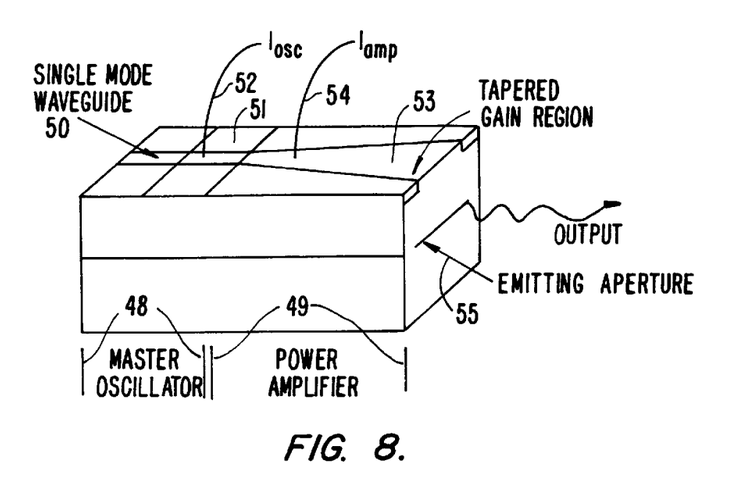
FIG. 8 shows a diode laser with a following optical semiconductor amplifier.

A configuration comprising a diode laser 48 and an optical semiconductor amplifier 49 is represented in FIG. 8. The optical wave of the diode laser 48 is generated in a gain-producing region 51, which has a semiconductor junction which is supplied with current 52. A monomodic wave guide 50 adjoining at the left has a structure which is required for assuring the emission of only one optical frequency. The optical semiconductor amplifier 49 adjoining the diode laser 48 at the right is embodied in a gain-producing structure 53, which exponentially widens in the direction of the propagation of the light to be amplified and which, supplied with a feed current 54, assures a constant optical output density along an also exponentially widening optical wave guide, whose output 55 radiates an optical beam which is greatly astigmatically amplified, though.

Figure 9:
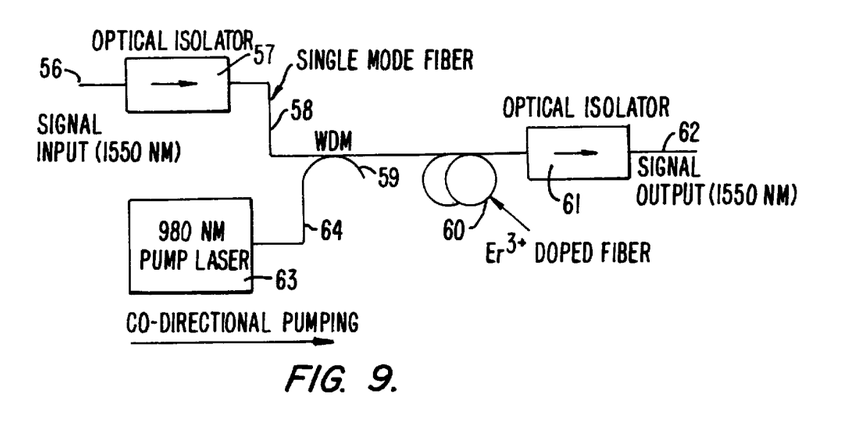
FIG. 9 shows a fiber-optical amplifier.

A further option for amplifying an optical wave inside an optical wave guide is represented in FIG. 9. An optical wave 56 guided in a monomode fiber is conducted through an optical isolator 57, which has the property of letting light pass only in one direction between its two connections. Light in the opposite direction is damped out. Subsequently the optical wave 56 is conducted through a monomode fiber 58 to a wavelength multiplexer 59, which consists of two wave guides arranged at a close distance to each other. In the course of passing through one of the wave guides arranged parallel with each other, light of defined wavelengths can change over to the neighboring wave guide. The optical wave 56 remains in its wave guide, a pump light wave generated in a pump light source 63 and conducted via a further monomode fiber 64 to the second wave guide of the wavelength multiplexer 59 changes over to the wave guide of the optical wave 56 and is used to bring the erbium ions introduced into the core of the monomode fiber 60 into an excited state, which subsequently return into a non-excited state while giving off a photon of the wavelength of the optical wave 56 exactly at the time at which they are impacted by photons of the wavelength of the optical wave 56. The increase in photons of the wavelength of the optical wave 56 obtained in this way represents the optical amplification of the optical wave 56 which was achieved. Thereafter the optical wave 56 is conducted through a further isolator 61 in order to be available at its output as an amplified optical wave 62. Both optical isolators 57 and 61 are used to prevent the formation of a laser cavity with reflecting points located outside the amplifier, in order to suppress a tendency towards natural optical oscillations.

Figure 10:
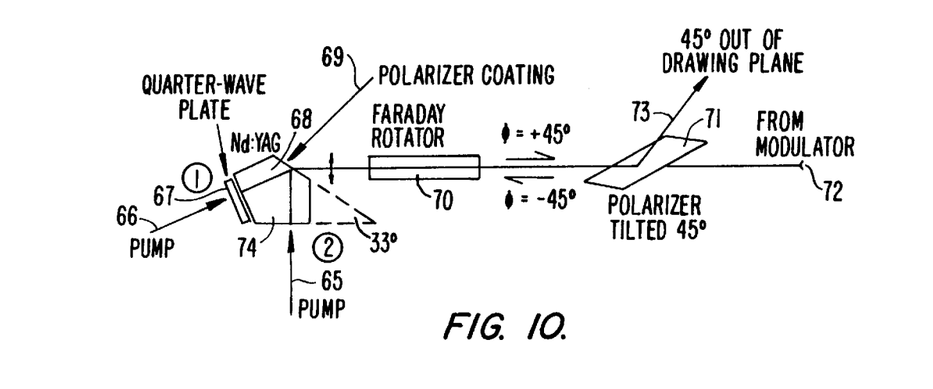
FIG. 10 shows a diode laser-pumped optical solid state amplifier.

An optical solid state amplifier pumped by diode lasers is represented in FIG. 10. The optical beam 72 to be amplified initially impinges on a polarizing beam splitter 71 in a polarization with which the optical beam 72 can pass through the polarizing beam splitter 71 without being reflected into another direction. Subsequently the optical beam 72 passes through a Faraday rotator 70, in which the polarization of the optical beam 72 is rotated by 45 degrees. This is accomplished in the Faraday rotator 70, in that the electrical field moves the optical beam 72 against atoms bound on charge carriers of a medium through which the optical beam 72 radiates under the effect of a static magnetic field of the frequency of the optical beam 72 provided, in the direction of the propagation of the optical beam 72. The movement of the charge carriers generates a polarization which in turn generates a field, wherein in accordance with Lorenz a leakage component is generated by the static magnetic field, which is perpendicular in respect to the driving electrical optical field. Because of this a polarization rotation is slowly created during the passage of the optical beam through the medium. The polarization of the optical beam 72 rotated by 45 degrees subsequently impinges on a polarization-selective coating 69 of a neodymium-YAG crystal 68, and is directed towards of a quarter-wave plate 67 located in the immediate vicinity of a surface of the neodymium-YAG crystal 68. The quarter-wave plate 67 is arranged in such a way that the beam which is reflected at the rear face has its polarisation rotated by 90°. The still linearly polarized optical beam 72 is split into two partial components, which are orthogonally polarized in respect to each other and which have a difference of their phases of 90 degrees in respect to each other while passing through a quarter-wave plate 67. In combination, therefore a circularly polarized optical wave is thereby created which, after a complete reflection at a dielectric coating applied to the exterior of the quarter-wave plate 67 passes through the quarter-wave plate 67 a second time in the opposite direction, because of which a phase difference of 180 degrees is created between the two components of the optical beam 72, which are of the same size and have been orthogonally polarized in respect to each other, so that the optical beam 72 is again combined into a linear, but—in respect to the incoming beam—orthogonally polarized optical beam.

This orthogonally polarized optical beam 72 is reflected at the polarization-selective coating 69 and is propagated toward a surface 74 of the neodymium-YAG crystal 68, at which it is totally reflected in the opposite direction. Following a further reflection at the polarization-selective coating 69, the orthogonally polarized optical beam 72 passes another time through the quarter-wave plate 67, at whose exterior surface a complete reflection takes place. The optical beam 72, which is now again present in its original polarization, is not reflected by the polarization-reflective coating 69 and passes in the opposite direction through the Faraday rotator 70, its polarization is rotated one more time by 45 degrees and it is therefore reflected in the direction of a beam 73 at the polarizing beam splitter 71. In this way the optical beam 72 passes six times through the pumped regions of the neodymium-YAG crystal.

In the process the optical beam 72 is optically amplified in that the photons of the optical beam 72 impinge on optically excited atoms which, stimulated in turn by the photons of the optical beam 72, release photons of the same wavelength and same phase when changing to a non-excited state. The excited state of the appropriate atoms of the neodymium-YAG crystal 68 is caused by the photons of an optical wave of a defined shorter wavelength, which are conducted into the crystal in pump beams 65 and 66. In this case the dielectric coatings of the exterior surfaces of the quarter-wave plate 67 as well as of the surface 74 are embodied in such a way that in contrast to the optical beam 72, the beams 65 and 66 are not reflected. If the optical beam 72 impinges on a neodymium-YAG crystal 68 with a high density of excited atoms, a few photons of the weak optical beam 72 will respectively generate many additional photons, i.e. they will be amplified by a large factor. However, in this case the absolute number of newly generated photons is small compared with the high density of excited atoms in the neodymium-YAG crystal 68. Since after a defined length of time the atoms return to their non-excited state, it is necessary to provide constant replacements by means of a high power of pump light. A high power of the optical beam 72 entering the neodymium-YAG crystal means that a multitude of photons impinge on excited atoms, but that because of this the density of excited atoms is drastically reduced and therefore the probability of the individual photon of the optical beam 72 entering the neodymium-YAG crystal 68 and generating a defined number of additional photons is reduced. Now the predominant plurality of the excited atoms will no longer change into the non-excited state spontaneously, but by being stimulated by other photons, and therefore create photons used for amplification.

Accordingly, a strong amplification of an optical beam 72 is contrary to high efficiency in regard to the pump light employed. This contradiction can be partially overcome in that, on the one hand, the stimulating pump light and the consuming optical beam 72 overlap as much as possible in the neodymium-YAG crystal 68 and, on the other hand, the optical beam 72 passes many times through the volume of the neodymium-YAG crystal 68 containing the excited atoms, such as is the case in the device described in FIG. 10.

Figure 11:
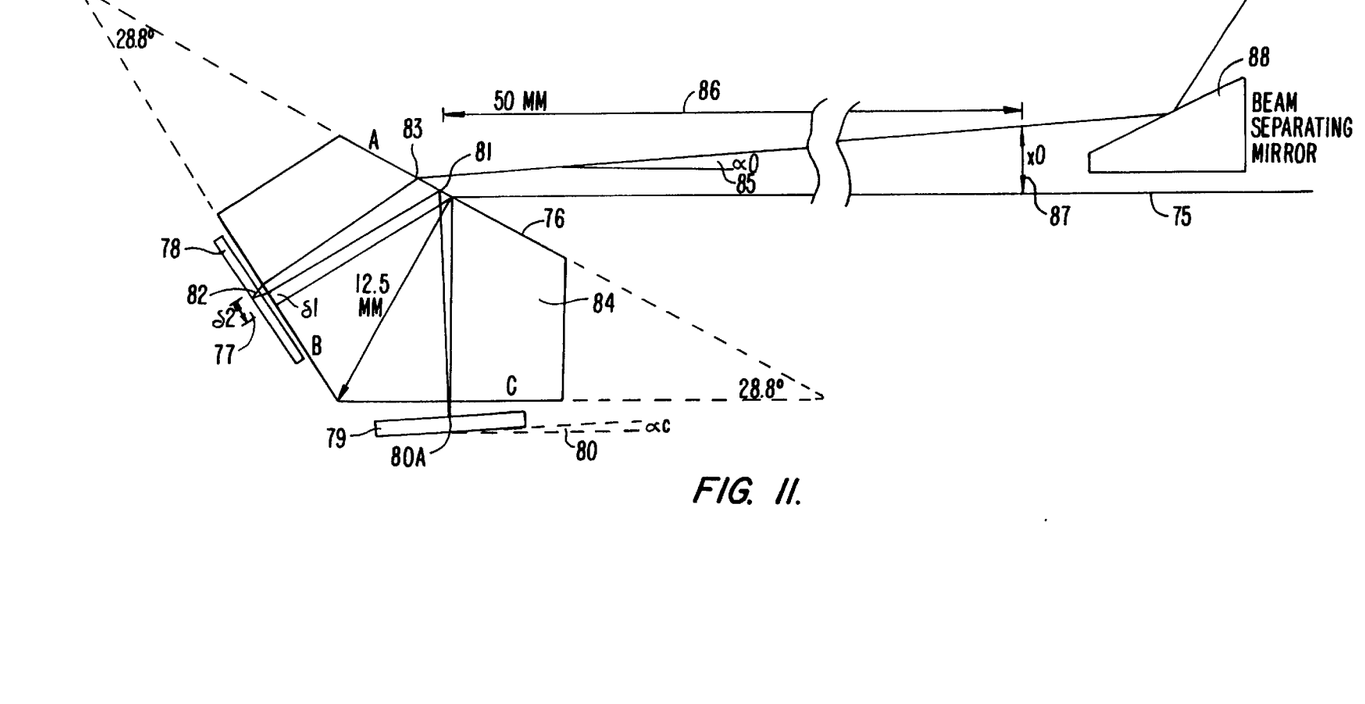
FIG. 11 shows a diode laser-pumped optical solid state amplifier without an optical isolator.

A further development of the optical amplifier represented in FIG. 10 is described in FIG. 11.

Since a Faraday rotator (at a wavelength of 1,06 micron) represents an excessive mass for space application, it is more advantageous to achieve the separation of the optical beams entering and leaving the device by means of a slightly oblique reflection. An optical beam 75 to be amplified enters a neodymium-YAG crystal 84 through a polarization-selective coating 76 and is reflected, after having passed through it, at a point 77 on the exterior surface of a quarter-wave plate 78, wherein the reflected optical beam 75, whose polarization is now rotated by 90 degrees, is reflected at the polarization-selective coating 76 at its initial entry location into the neodymium-YAG crystal 84 in the direction of a mirror 79 placed in the immediate vicinity of the neodymium-YAG crystal. The mirror 79 is slightly tilted at a narrow angle 80 in respect to the right angle of the incoming optical beam 75, so that the optical beam 75, which is unchanged in polarity and is reflected at the mirror 79, is reflected at a point 81 by the polarization-selective coating 76 in the direction toward the quarter-wave plate 78. Following further reflection at a point 82 on the exterior of the quarter-wave plate 78, the optical beam 75 passes through the polarization-selective coating 76 at a point 83 in order to be propagated at an angle 85 in respect to the direction of the incoming optical beam 75. Advantageously the angle between the coating 76 and the incoming/outgoing optical beam 75 has a value, which is close to the value of the Brewster angle. The partial reflection of the optical beam exiting at the point 83 in the neodymium-YAG crystal 84 in particular must be minimized. At a distance 86, a sufficient lateral distance 87 from the incoming optical beam 75 is created in order to make it possible to perform a separation of the exiting optical beam by means of a small mirror 88. The pump light is supplied over the same paths as represented in FIG. 10.

The exterior of the quarter-wave plate 78 as well as the reflecting layer of the mirror 79 are also coated or respectively embodied so that the pump light is not reflected.

In the described device in accordance with FIG. 11, the optical beam 75 passes six times through the pumped regions of the neodymium-YAG crystal 84.

Figure 12:
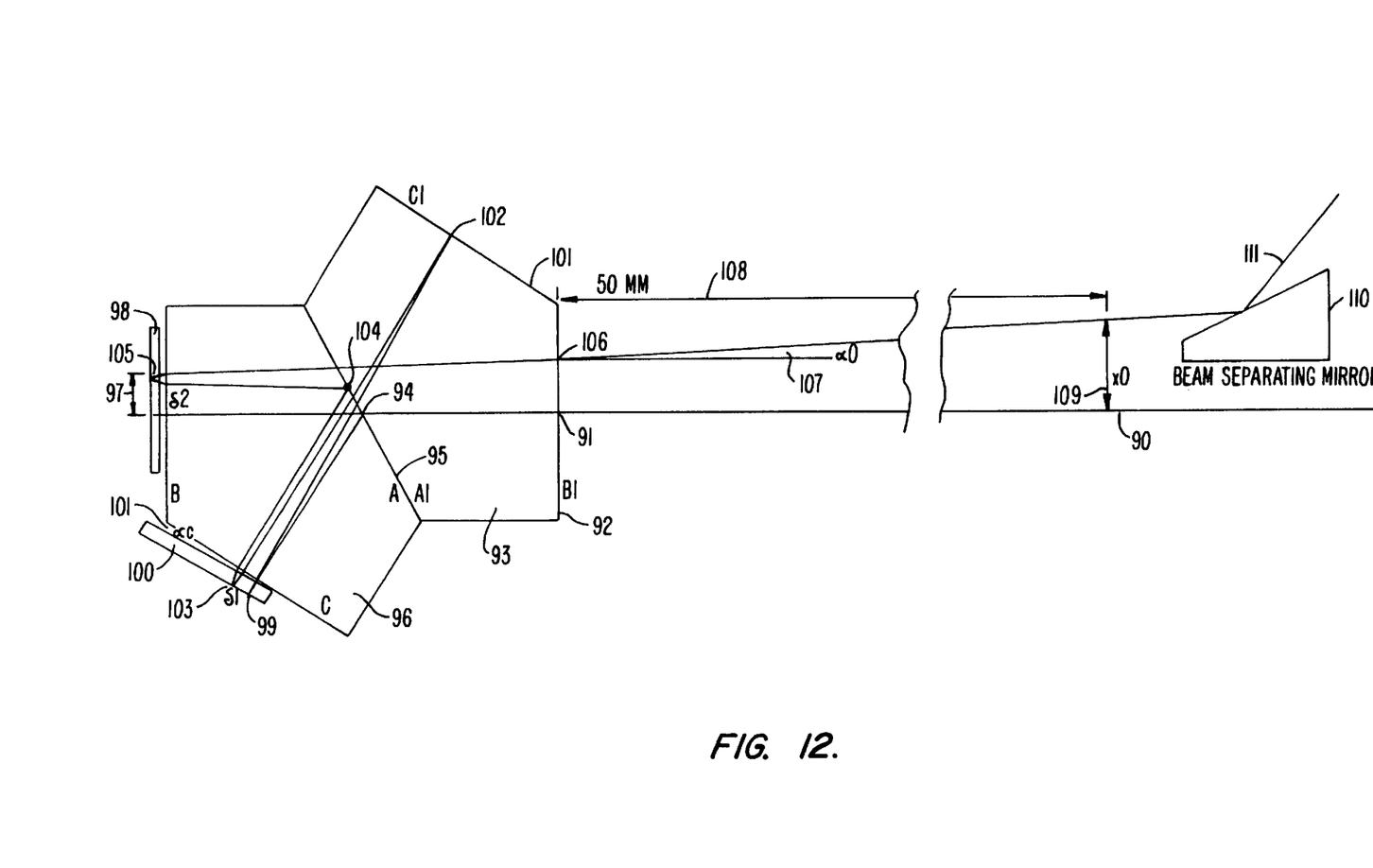
FIG. 12 shows a diode laser-pumped optical solid state amplifier without an optical isolator with additional propagating paths in the gain-generating medium.

A further device with a two-piece neodymium crystal is represented in FIG. 12. At a point 91 an optical beam 90 enters a neodymium-YAG crystal 93 and impinges on a polarization-selective layer 95 at the point 94, which lets the suitably polarized optical beam 90 pass into an adjoining neodymium-YAG crystal 96. After passage through a quarter-wave plate 98 and reflection at a point 97 of the reflectively-coated side of the quarter-wave plate 98 facing away from the neodymium-Yag crystal 96, it passes a second time through the plate 98 in order to be given, respectively, a polarization which is orthogonal in respect to the previous polarization, and is therefore reflected at the point 94 at the polarization-selective layer 95 in the direction toward a second quarter-wave plate 100. Because of a slight angle 101 of the quarter-wave plate 100 in respect to the right angle of the optical beam 90 impinging from the direction of the point 94, following two passages through the quarter-wave plate 100 because of a reflection at the point 99, the passage of the optical beam 90, again rotated in its polarization propagates through the polarization-selective layer 95, to a point 102 of a reflecting layer 101. In order to increase the gain of the amplifier, a further (not drawn in for reasons of clarity) pump light source is connected at the point 102. Thereafter the optical beam 90, unchanged in polarization, again passes through the polarization-selective layer 95 in the direction toward the quarter-wave plate 100, on whose side facing away from the neodymium-YAG crystal it is reflected at a point 103, which is laterally displaced from the point 99. Because of passing twice through the quarter-wave plate 100, it is reflected with a polarization rotated by 90 degrees at the polarization-selective coating 95 at a point 104 in the direction toward the quarter-wave plate 98. Following reflection on the exterior of the quarter-wave plate 98 in a point 105, which is laterally displaced from the point 97, the optical beam 90, which is again rotated in its polarization by 90 degrees because of passing twice through the quarter-wave plate 98, passes through the polarization-selective coating 95 in order to leave the neodymium-YAG crystal 93 at a point 106, which is laterally displaced from the point 91. The optical beam 90 is now propagated in the opposite direction along a distance 108 and additionally tilted by a small angle 107, whereafter it has reached a sufficient distance 109, which permits its separation by means of a mirror 110. Pump light is supplied through the two quarter-wave plates 98 and 100 and the (signal-light-)reflecting layer 101, wherein, in contrast to the optical beam 90, their sides facing away from the neodymium-YAG crystal 96 do not reflect the pump light but let it pass. The crystal 93 may be supplied by pump light via the quarter-wave plates 98 and 100, if the polarization-selective layer 95 doesn't deflect pump light. The neodymium-YAG crystal 93 is passed along two gain paths, and the neodymium-YAG crystal 96 even along eight gain paths.

What has been described above are only exemplary embodiments, to which the invention is expressly not limited, instead they are also intended to include, among others, laser arrangements with other isotropic gain media.

In particular, the method can additionally contain at least one of the following features:

- at least one polarizing beam splitter 32 is used in multiple numbers, which is connected with at least one movable half-wave plate 35 in order to precisely align the emissions of at least three polarized diode lasers 30 on the solid state amplifier 34;
- a crystal 68 is used as the amplifying medium in the solid state amplifier 18 pumped by the diode lasers 65, 66, which is provided on its exterior surfaces with a polarization-selective coating 69, reflective layers 74 and a quarter-wave plate 67, in order to allow in this way the multiple passage of the light to be amplified through the gain-producing medium 68;
- the optically pumped solid state amplifier 18 contains a gain-producing medium 18M, through which several passes are made within the framework of an amplification cycle;
- the emission of the diode laser 30 emitting on an optical frequency can be selectively connected with several diode lasers 30 prior to being supplied to the pumped optical solid state amplifier 34;
- phase modulation is performed in the wave guide of a traveling wave phase modulator and is subsequently amplified in a neodymium-doped optical fiber;
- the emission of the diode laser 38 emitting on an optical frequency receives pump light via a multimode optical fiber 41 from an ensemble of diode lasers 38 arranged set-off on an optical unit;
- the emission of the diode laser emitting on an optical frequency takes place from at least two diode lasers 20, 21, which are supplied via a polarizing beam splitter 24 to the amplifying laser crystal 27.

Preferably the crystal 68, which can be utilized as the amplifying medium, of an arrangement is a neodymium-YAG crystal.

What is claimed is:

1. A laser system for optical free space communications, in particular the generation of amplified laser light under conditions in outer space, comprising:

a diode or diode pumped solid state laser for generating unmodulated light on an optical frequency;

electro optical modulator means for producing a phase modulated laser light from said unmodulated laser light and including means for maintaining the polarization of the unmodulated laser light;

means for forwarding said phase-modulated laser light to focussing means for producing a collimated beam for an optically pumped solid state amplifier whose output is connected via an optical fiber to an optical beam-shaping device;

said optically pumped solid state amplifier including a polarizing beam splitter and a gain producing medium, and a wave plate on an exterior surface of said gain producing medium.

2. The laser system of claim 1, wherein said focussing means includes an optical isolator means which conducts said modulated laser light in the form of a free, collimated beam into said optically pumped solid state amplifier with which a further optical isolator means is connected including said optical beam-shaping device.

3. The laser system of claim 2, wherein said solid state amplifier is pumped by diode lasers, wherein said gain-producing medium is a crystal provided with a polarization-selective coating with reflective layers and wherein said wave-plate is a quarter-wave plate on an exterior surface of said crystal.

4. The laser system of claim 3, wherein said quarter-wave plate is located in immediate vicinity of a surface of said crystal.

5. The laser system of claim 2, wherein said polarizing beam splitter is connected downstream of said means for generating unmodulated laser light and from two orthogonally polarized emissions from two pump light sources, by means of which together a single beam is supplied to said optically pumped solid state amplifier.

6. The laser system of claim 5, wherein adjustable lenses are provided for the individual alignment of the emissions of said pump light sources.

7. The laser system of claim 6, wherein said solid state amplifier, pumped by diode lasers, has a further arrangement, comprising a Faraday rotator, a polarization-selective coating and a polarizing beam splitter, which can be multiply utilized as an optical isolator.

8. The laser system of claim 7, wherein an obliquely reflecting mirror is provided to said crystal, which is usable as the gain-producing medium, below a first outlet point of said optical beam to be amplified and which allows the separation of an incoming and outgoing optical beam to be amplified without the additional Faraday rotator and polarizing beam splitter.

9. The laser system of claim 2, wherein said diode or diode-pumped solid state laser and said optically pumped solid state amplifier are of neodymium-YAG crystal type.

10. The laser system of claim 1, wherein said gain-producing medium comprises a first crystal and a second crystal which are placed next to each other, and wherein a surface of said first crystal is connected with a surface of said second crystal via a polarization-selective layer.

11. The laser system of claim 10, wherein an optical beam deflection from an incoming optical beam through said gain-producing medium of said first and second crystals to an amplified outgoing beam is realized by two quarter-wave plates.

12. The laser system of claim 1, wherein said electro-optical modulator means comprises a lithium niobate block in which a rectangular channel has a slightly higher refraction coefficient than the material surrounding it and having two electrodes as input for the modulation voltage and constituting a high frequency wave guide.

13. The laser system of claim 1, wherein said optically pumped solid state amplifier comprises a first optical isolator connected via fiber means to a second isolator and having a wavelength multiplexer connected to a pump laser.

14. A laser system for optical free space communications, in particular the generation of amplified laser light under conditions in outer space, comprising a diode or diode-pumped solid state laser for generating unmodulated light on an optical frequency;

electro-optical modulator means producing a phase-modulated laser light from said unmodulated laser light and including means for maintaining the polarization of the unmodulated laser light;

means for forwarding said phase-modulated laser light to focussing means for producing a collimated beam for an optically pumped solid state amplifier which output is connected via an optical fiber to an optical beam-shaping device;

said optically pumped solid state amplifier including a plurality of polarizing beam splitters, at least one movable half-wave plate, a gain-producing medium, and a set of diode lasers coupled to said beam splitters, wherein it is possible to insert said at least one movable half-wave plate between two polarizing splitters, and wherein the emission from said set of diode lasers coupled to said beam splitters are precisely aligned with said solid state amplifier.

* * * * *